US012151254B2

United States Patent
(12) United States Patent
Alluigi

(10) Patent No.: US 12,151,254 B2
(45) Date of Patent: Nov. 26, 2024

(54) TRIGGER DISPENSING HEAD FOR A COMPACT DISPENSER

(71) Applicant: GUALA DISPENSING S.P.A., Alessandria (IT)

(72) Inventor: Riccardo Alluigi, Alessandria (IT)

(73) Assignee: Guala Dispensing S.P.A., Alessandria (IT)

( * ) Notice: Subject to any disclaimer, the term of this patent is extended or adjusted under 35 U.S.C. 154(b) by 233 days.

(21) Appl. No.: 17/927,235

(22) PCT Filed: May 26, 2021

(86) PCT No.: PCT/IB2021/054561
§ 371 (c)(1),
(2) Date: Nov. 22, 2022

(87) PCT Pub. No.: WO2021/240377
PCT Pub. Date: Dec. 2, 2021

(65) Prior Publication Data
US 2023/0286002 A1 Sep. 14, 2023

(30) Foreign Application Priority Data
May 26, 2020 (IT) ........................ 102020000012418

(51) Int. Cl.
*B05B 11/10* (2023.01)

(52) U.S. Cl.
CPC ....... *B05B 11/1011* (2023.01); *B05B 11/1074* (2023.01)

(58) Field of Classification Search
CPC ............. B05B 11/1011; B05B 11/1074; B05B 11/1077; B05B 11/1039; B05B 11/0008; B05B 11/007
See application file for complete search history.

(56) References Cited

U.S. PATENT DOCUMENTS

| | | | | |
|---|---|---|---|---|
| 4,153,203 A * | 5/1979 | Tada | B05B 11/1074 | 239/493 |
| 5,211,315 A * | 5/1993 | Geier | B05B 11/1011 | 222/340 |
| 6,286,723 B1 * | 9/2001 | Sweeton | B05B 11/1077 | 222/384 |

(Continued)

FOREIGN PATENT DOCUMENTS

| | | |
|---|---|---|
| WO | 2011128787 A1 | 10/2011 |
| WO | 2017115159 A1 | 7/2017 |
| WO | 2019116115 A1 | 6/2019 |

OTHER PUBLICATIONS

International Search Report and Written Opinion for International Patent Application No. PCT/IB2021/054561, mailed Nov. 9, 2021, 12 pages.

*Primary Examiner* — Donnell A Long
(74) *Attorney, Agent, or Firm* — Armstrong Teasdale LLP

(57) ABSTRACT

A trigger dispensing head for a compact dispenser is provided. The trigger dispensing head has a frame, a piston chamber, a piston, a dispensing pipe, a trigger, and a return element having two arms. Each arm of the two arms is arranged in a respective part of a sagittal plane. A lower backing part, supported by the frame, has a main surface. Lower ends of the return element are in contact with the main surface and freely movable thereon.

18 Claims, 11 Drawing Sheets

(56) References Cited

U.S. PATENT DOCUMENTS

| | | | | |
|---|---|---|---|---|
| 8,887,967 | B2 * | 11/2014 | Alluigi | B05B 11/1016 222/383.1 |
| 9,579,675 | B2 * | 2/2017 | Foster | B05B 11/1077 |
| 9,987,648 | B2 * | 6/2018 | Fujiwara | B05B 11/0044 |
| 2006/0054642 | A1 * | 3/2006 | Buti | B05B 11/1074 222/383.1 |
| 2008/0116222 | A1 * | 5/2008 | Alluigi | B05B 11/1069 222/384 |
| 2009/0152304 | A1 * | 6/2009 | Foster | B05B 11/1074 222/340 |
| 2011/0036871 | A1 * | 2/2011 | Tada | B05B 11/1011 222/383.1 |

* cited by examiner

TRIGGER DISPENSING HEAD FOR A COMPACT DISPENSER

CROSS-REFERENCE TO RELATED APPLICATION

This application is a National Stage Application of International Patent Application No. PCT/IB2021/054561, having an International Filing Date of May 26, 2021, which claims priority to Italian Patent Application No. 102020000012418 filed May 26, 2020, the entire contents of which are hereby incorporated by reference herein.

FIELD OF THE INVENTION

This patent application relates to the sector of trigger dispensers used for dispensing liquid products, in innumerable applications. In particular, it is an object of the present invention to provide a trigger dispensing head for compact dispensers, usually named "mini-triggers". These trigger dispensers are usually used in the personal care sector, e.g., for dispensing sun care products, or for air care products, characterized by very small dimensions compared to the dispensers usually used in other applications, such as that of household hygiene. Indeed, in some sectors, such as those mentioned, it is necessary to be able to dispense small doses of the product, given its nature, or have small-size bottles because they contain seasonal products.

BACKGROUND OF THE INVENTION

In recent years, there has been a considerable increase in attention to environmental problems, by both consumers and manufacturers, also in the sector to which the present invention relates. In such a context, one of the most common needs is to produce the entire trigger dispenser, or at least the dispensing head, with plastic materials belonging to the same family, and in particular to the polyolefin family. This makes it possible to effectively recycle the entire dispensing head without having to separate the components.

Obviously, such a need is having a considerable impact on the design and manufacturing of the devices at issue, whose numerous components (e.g., at least a dozen for a usual trigger dispensing head) were each made of the most appropriate material to meet functional requirements, such as chemical compatibility, and mechanical strength and reliability.

In the specific sector of mini-triggers, the manufacturing of the operating spring on the trigger has proven to be particularly difficult because it is easily subject to yielding due to the new materials to be used and the small dimensions compared to those of the dispensing heads used in other sectors. The yielding of the spring results in a malfunctioning of the dispensing head because the trigger does not return to the resting position and neither does the piston connected to it so that the piston chamber does not fill adequately and the desired dose of the product is not dispensed.

OBJECT OF THE INVENTION

It is the purpose of the present invention to make a trigger dispensing head for mini-trigger that meets the needs of the industry while overcoming the drawbacks discussed above at the same time.

Such an object is achieved by a dispensing head as described and claimed herein. Advantageous embodiments of the present invention are also described.

BRIEF DESCRIPTION OF THE DRAWINGS

The features and advantages of the present invention will be apparent from the following description, given by way of non-limiting example, according to the accompanying figures, in which.

DETAILED DESCRIPTION OF AN EMBODIMENT

Figure 1:
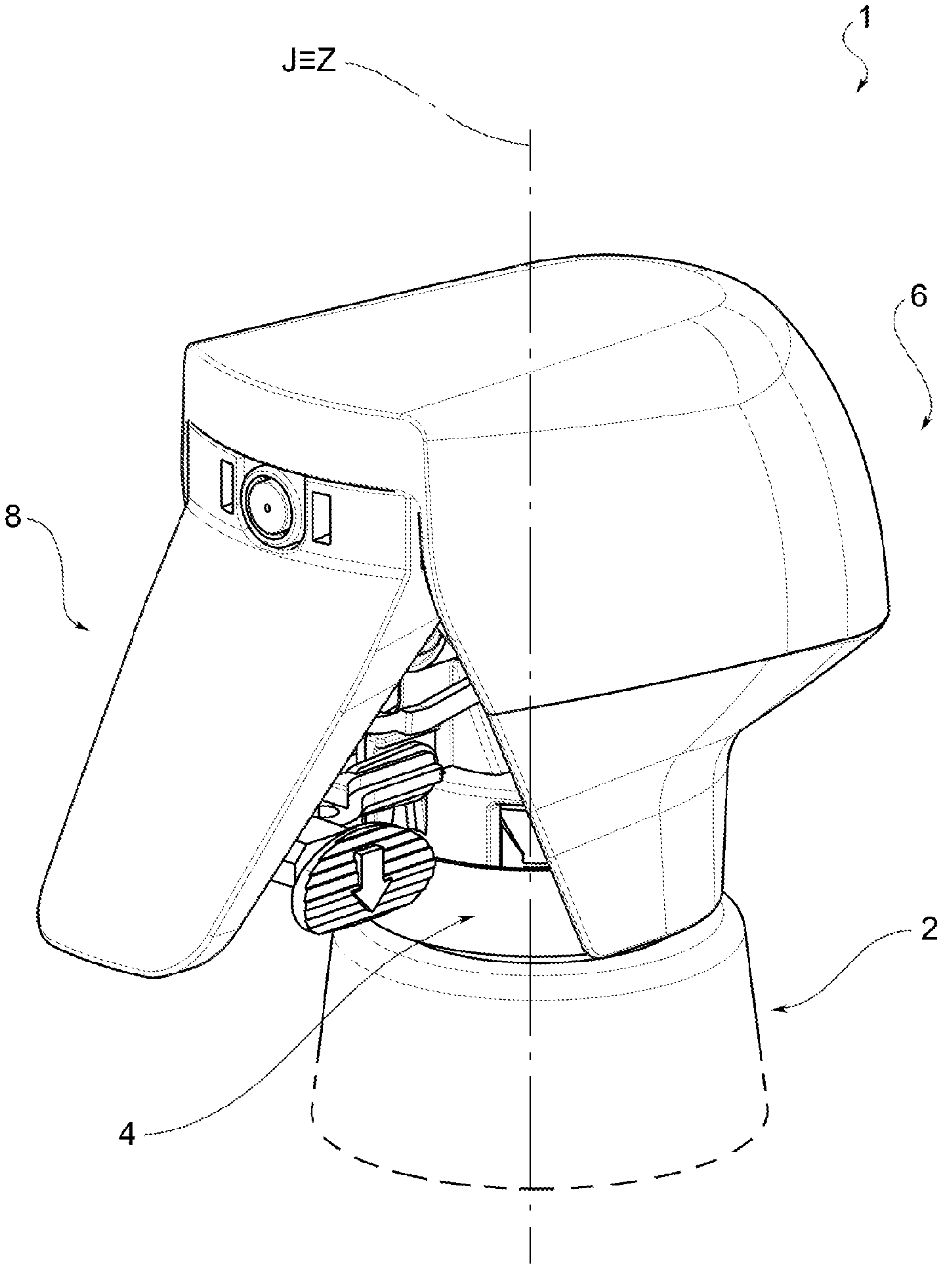
FIG. 1 shows a trigger dispensing device according to an embodiment of the present invention.

With reference to the figures in the accompanying figures, reference numeral 1 as a whole indicates a trigger dispensing device, e.g., for containing liquid personal care products, e.g., for dispensing sun care or air care products.

The dispensing device 1 comprises a bottle 2 for containing the product to be dispensed, provided with a neck 4 having a central neck axis Z, and a dispensing head 6 with trigger 8 for manual actuation, applied to the neck 4 of the bottle 2, e.g. by means of a bayonet or threaded connection (FIG. 1).

Figure 2:
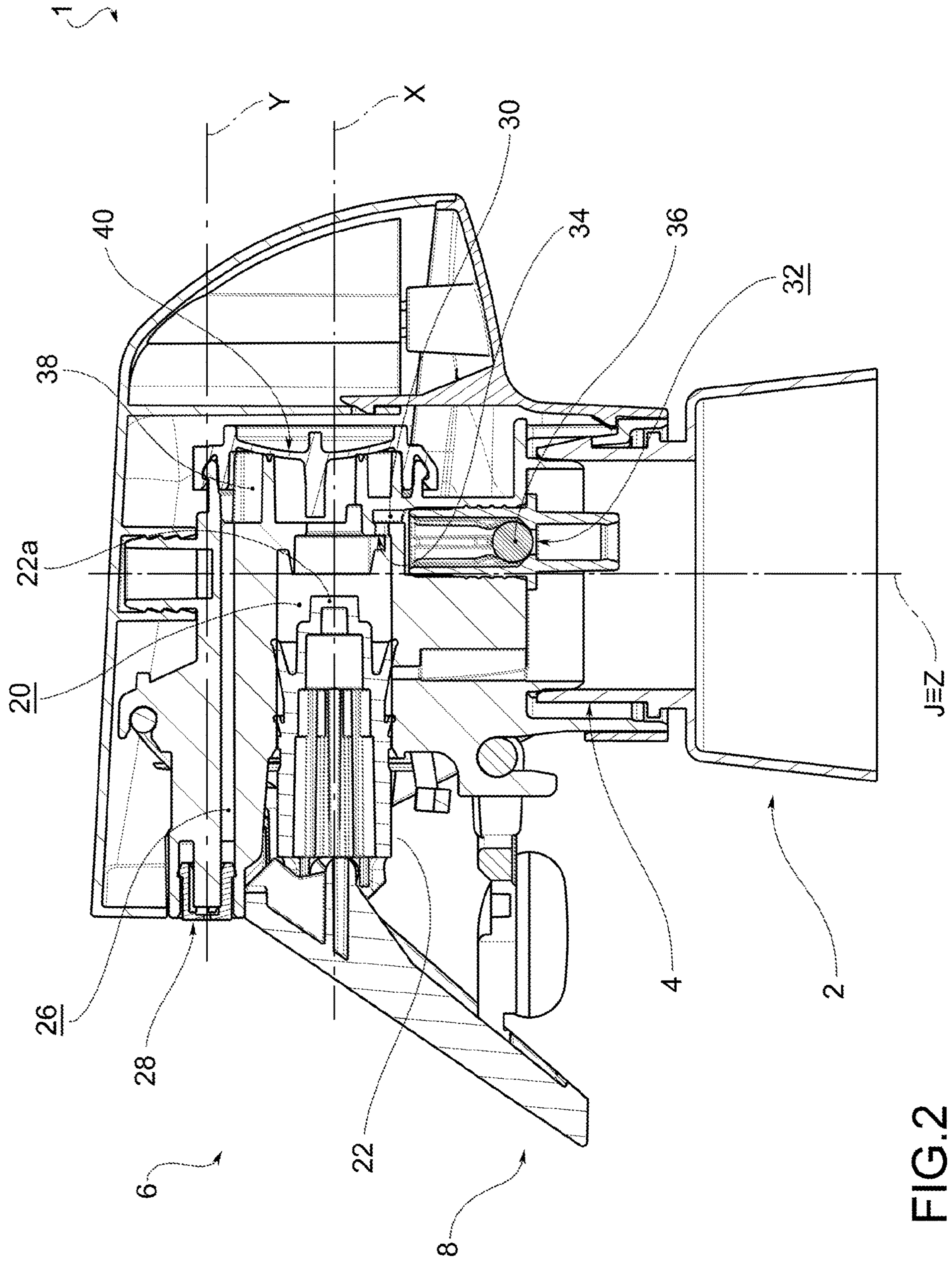
FIG. 2 is a section view of the dispensing device of FIG. 1 in a locked configuration.
Figure 3:
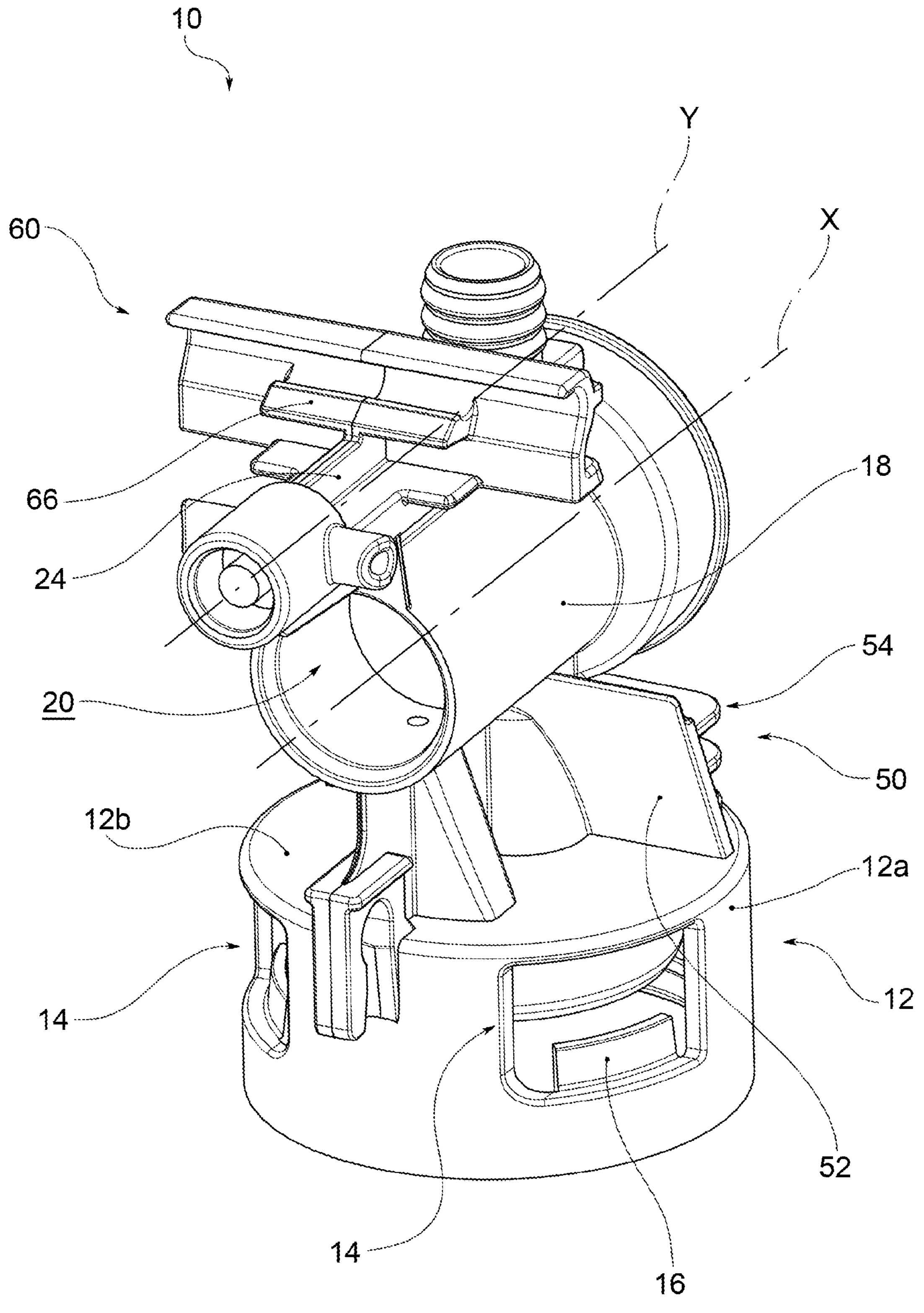
FIGS. 3, 4, and 5 show an embodiment of a frame of the dispensing device in FIG. 1.
Figure 4:
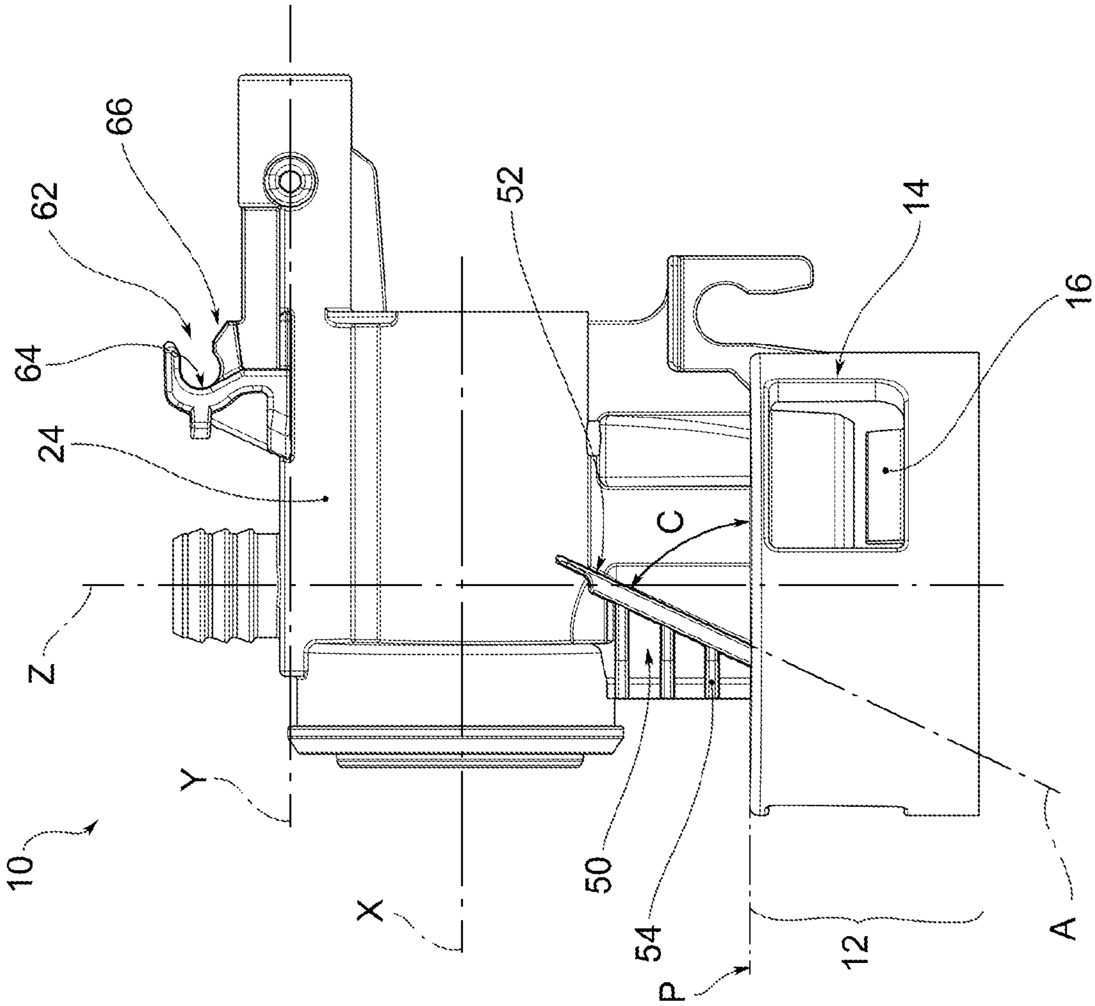
Figure 5:
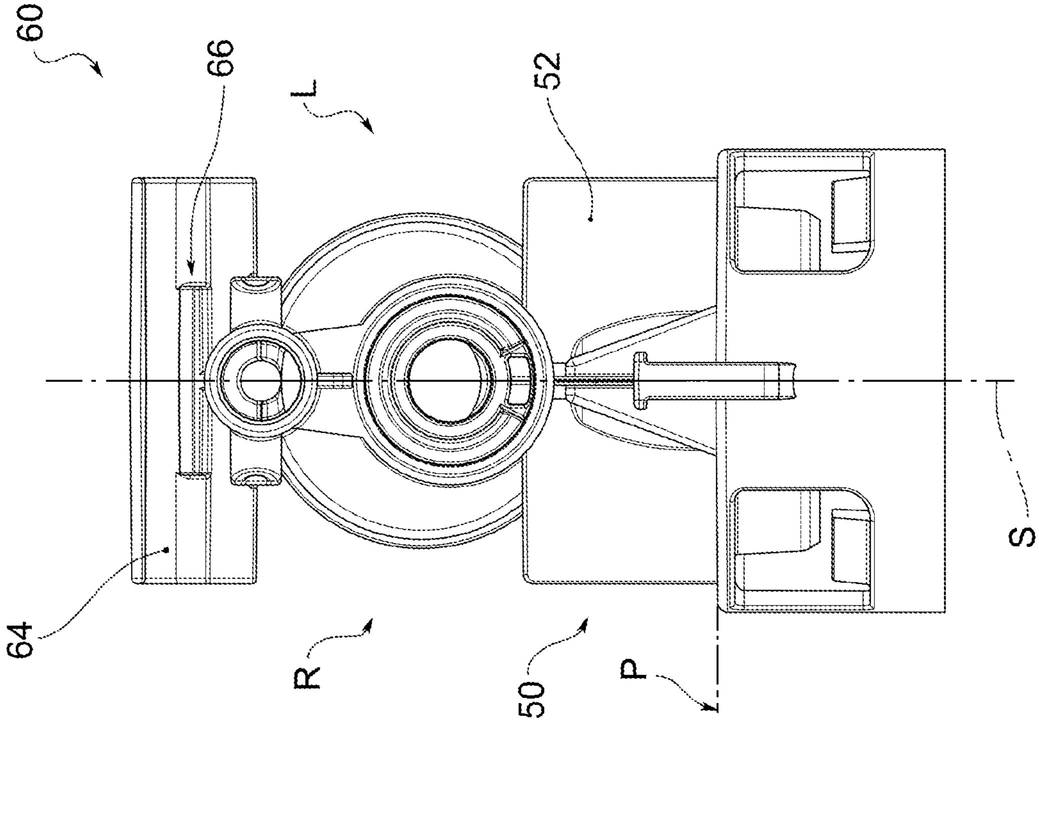
Figure 6:
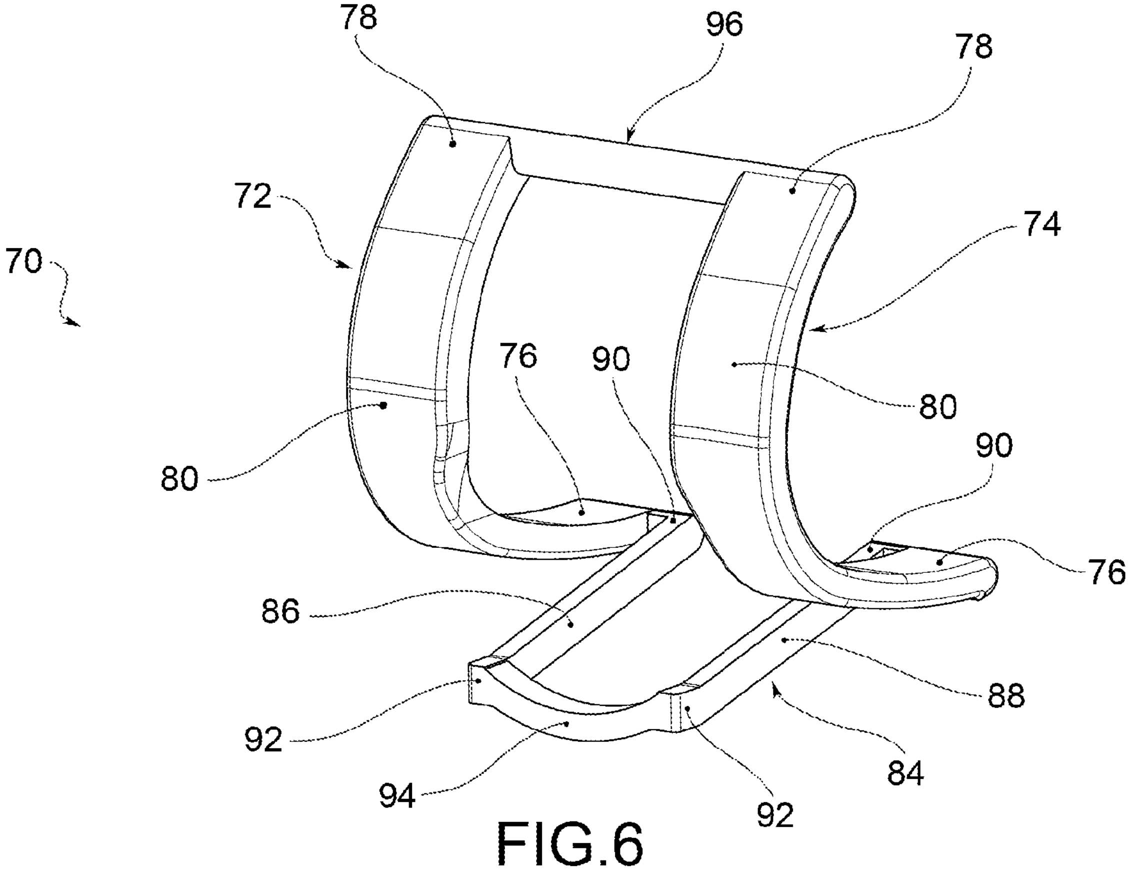
FIGS. 6, 7, 8, 9, and 10 show an embodiment of a return element of the dispensing device in FIG. 1.
Figure 7:
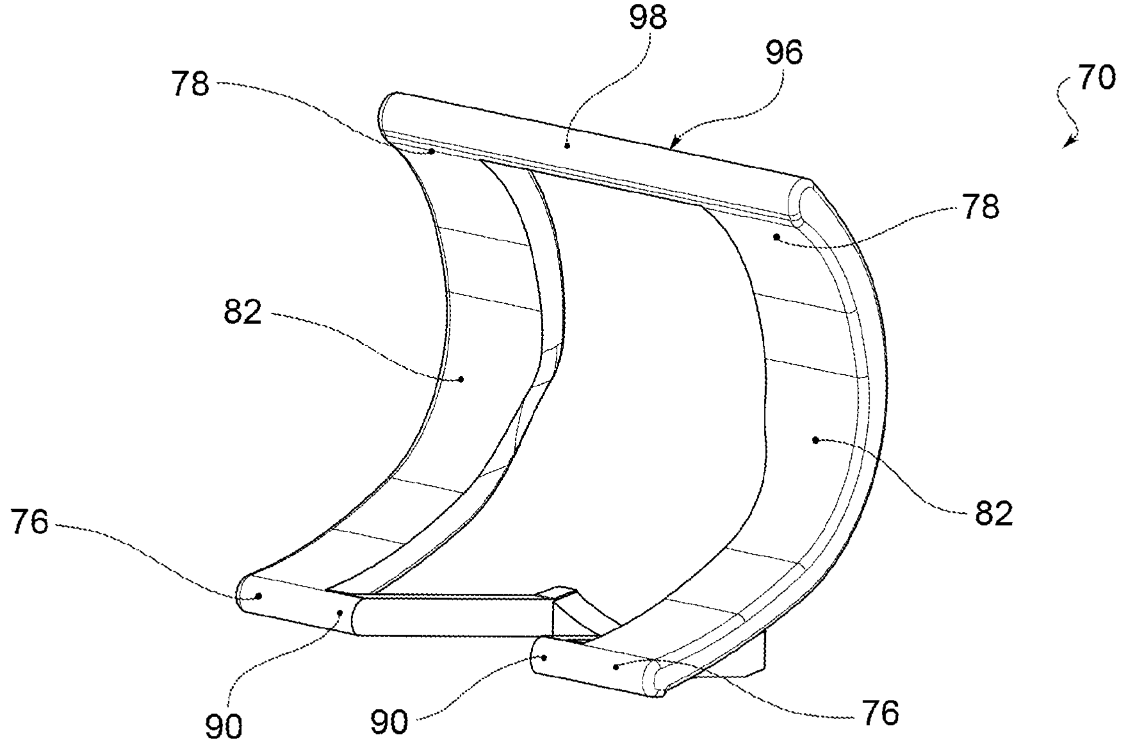
Figure 8:
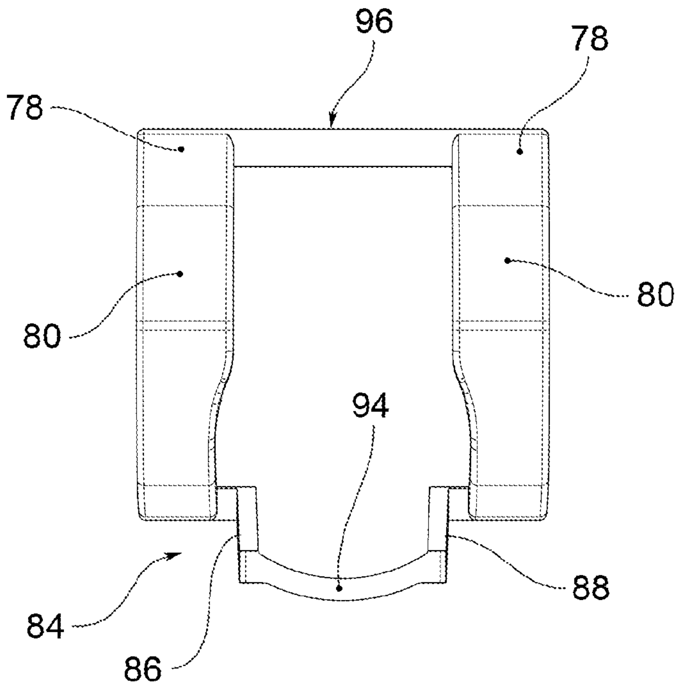
Figure 9:
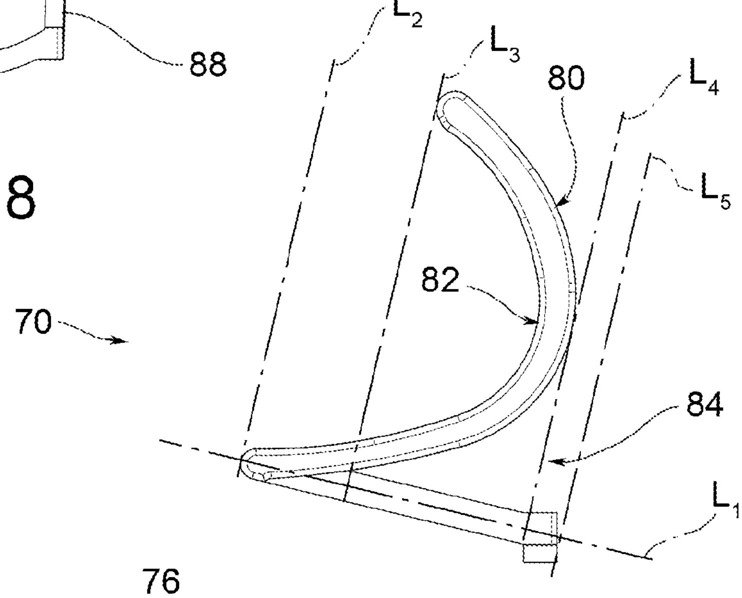
Figure 10:
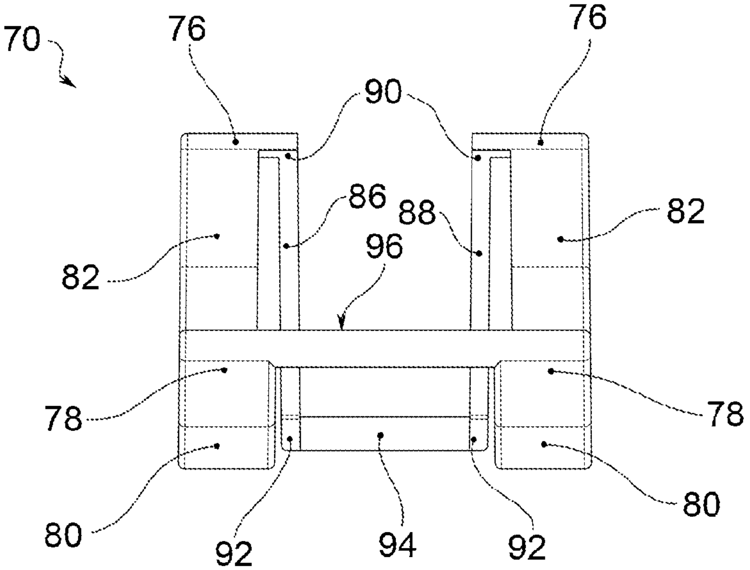

According to an embodiment, the dispensing head 6 comprises a frame 10 for supporting the other components of the head, typically made in one piece of plastic material, preferably chosen from the group of polyolefins, e.g., by injection molding (FIGS. 2 to 4).

The frame 10 comprises a connecting portion 12 for the preferably releasable connection to the neck 4 of the bottle 2. For example, the connecting portion 12 comprises an annular skirt **12*a* coaxial to the neck 4, thus having a skirt axis J coincident with the neck axis Z, provided with a plurality of windows 14 and fins 16, e.g., flexible, for connecting by snapping with elements provided on the neck, and a base 12*b* closing the skirt 12*a*** on top, the skirt preferably lying on a base plane P orthogonal to the neck axis Z.

The frame 10 further comprises a first annular wall 18 which delimits a piston chamber 20 which extends along a piston axis X incident to the skirt axis J, e.g., orthogonally thereto.

The head 6 further comprises a piston 22, operatively connected to the trigger 8, sealably sliding in the piston chamber 20 with reciprocating motion, to aspirate the liquid product from the bottle into the piston chamber in a step of suction and to dispense liquid product from the piston chamber to the outside in a step of dispensing.

The piston 22 and the piston chamber 20 are an example of pumping means adapted to be actuated by the trigger 8 to aspirate the liquid product from the bottle in a step of suction and to dispense the liquid product outside in a step of dispensing.

The frame 10 further comprises a second annular wall 24 which delimits a dispensing pipe 26 which extends along a dispensing axis Y incident to the skirt axis J, e.g., orthogonally thereto. Preferably, the dispensing axis Y is parallel to and spaced apart from the piston axis X and preferably on the side opposite to the connecting portion 12 relative to the piston axis X.

Preferably, a sagittal plane S is defined for the dispensing head 6, e.g., a symmetry plane, containing the piston axis X and the dispensing axis Y, and preferably passing through the skirt axis J; the sagittal plane S subdivides the dispensing head 6 into a right half-part R and a left half-part L, with reference to the dispensing direction of the product, which occurs frontally.

The dispensing head 6 further comprises a nozzle 28 applied to the free end of the dispensing pipe 26, e.g., to form the jet of the product during dispensing.

The head 6 further comprises an inlet pipe 30 adapted to put the compartment inside the bottle 2 in communication with the piston chamber 20; the inlet pipe extends from an inlet port 32 for the ingress of the aspirated product and an outlet port 34 for the ingress of the product into the piston chamber 20. For example, said inlet pipe is formed in the frame 10.

Furthermore, the head 6 comprises non-return valve means, operating along the inlet pipe 30, adapted to allow the transit of the liquid product from the bottle to the piston chamber 20 in the step of suction and to prevent the return of the product from the piston chamber to the bottle in the step of product dispensing.

For example, said non-return valve means comprise a ball 36 which in the step of dispensing closes the inlet port 32 of the inlet pipe 30, and in the step of suction clears said inlet port 32.

The head 6 further comprises an outlet pipe 38 adapted to put the piston chamber 20 into communication with the dispensing pipe 26.

Furthermore, the head 6 comprises dispensing valve means, operating along the outlet pipe 38, adapted to allow the transit of the liquid product from the piston chamber 20 towards the outlet pipe 38 in a step of dispensing and to prevent the ingress of air from outside the piston chamber 20 in the step of product suction.

For example, said valve dispensing means comprise a deformable membrane 40. Preferably, a portion of the membrane 40 cooperates with the frame 10 to partially delimit the outlet pipe 38.

Preferably, said dispensing valve means are precompression means, adapted to allow the transit of the product from the piston chamber 20 to the dispensing pipe 26 only when the pressure of the product in the piston chamber 20 exceeds a predefined threshold value.

Preferably, furthermore, said valve delivery means are of the mechanically triggered type, i.e., they are mechanically forced to go from the closing configuration to the opening configuration. For example, said dispensing valve means are biased by the piston 22 at a trigger position in which it mechanically interferes with the dispensing valve means to forcibly transit from the closing configuration to the opening configuration.

For example, the piston 22 is provided with a protrusion **22*a* which, in the triggered position, mechanically operates on the membrane 40** to make it pass into the opening configuration.

According to an aspect of the invention, the head 6 comprises a lower backing part 50 supported by the frame 10.

Preferably, the lower backing part 50 is part of the frame 10 and, preferably, is located between the base **12*b* of the connecting portion 12 and the first wall 18 of the piston chamber 20**.

Preferably, furthermore, the lower backing part 50 extends from the right half-part R to the left half-part L, preferably continuously.

Furthermore, preferably, the lower backing part 50 has a flat main surface 52 lying on a backing part plane A incident to the base plane P; e.g., the backing part plane A forms with the base plane P on the front, i.e., on the product dispensing side, an acute (<90°) backing angle C, e.g., an angle greater than 60°, preferably between 65 and 85°, preferably equal to 75°.

Preferably, furthermore, the frame 10 comprises a plurality of ribs 54, e.g., parallel to the base plane P, which join the lower backing part 50 to the remaining portion of the frame 10.

According to a further aspect of the invention, the head 6 comprises an upper backing part 60 supported by the frame 10.

Preferably, the upper backing part 60 is part of the frame 10 and, preferably, overlies the dispensing pipe 26, i.e., it is located above the dispensing axis Y relative to the piston axis X, and extends from the second wall 24 into the right half-part R and the left half-part L, preferably continuously.

Frontally, the upper backing part 60 has a seat 62 having an arched bottom seat surface 64; a step 66 is placed preferably at the ingress of the seat 62 to achieve a coupling by snapping of the component inserted into the seat 62.

The head 6 comprises an at least partially elastic return element 70 (FIGS. 6 to 10), preferably made in one piece, preferably of plastic material, preferably chosen from the family of polyolefins or post-consumer recycled (PCR) or post-industrial recycled (PIR) materials, typically by injection molding.

The return element 70 comprises a pair of elastically deformable arms 72, 74; each arm 72, 74 extends from a lower end 76 to an upper end 78. Furthermore, each arm 72, 74 is arched and has a convex, forward-facing front face 80 and a concave, rear-facing rear face 82.

The return element 70 further comprises a lower joining portion 84, which joins the lower ends 76 of the two arms 72, 74. For example, the lower joining portion 84 comprises a pair of preferably straight branches 86, 88; each branch 86, 88 has a rear end 90 joined to a respective lower end 76 of the arm 72, 74, and a front end 92. The front ends 92 of the two branches 86, 88 are joined together by a lower crosspiece 94, preferably arched and in particular concave above and convex below.

The return element 70 further comprises an upper joining portion 96, which joins the upper ends 78 of the two arms 72, 74. For example, the upper joining portion 96 comprises an upper crosspiece 98, preferably having a rounded outer surface.

According to a preferred embodiment:

having defined a lower plane L1 passing through the two branches 86, 88 of the return element 70, a rear plane L2 orthogonal to the lower plane L1 and tangent to the lower ends 76 of the two arms 72, 74, and a front end plane L3 orthogonal to the lower plane L1 and passing through the upper ends 78 of the two arms 72, 74, the rear plane L2 is arranged behind the front end plane L3.

Furthermore, according to a preferred embodiment:

having defined a lower plane L1 passing through the two branches 86, 88 of the return element 70, a crest plane L4 tangent to the front surface 80 of the two arms 72, 74 and orthogonal to the lower plane L1 and a front plane L5 orthogonal to the lower plane L1 and tangent to the front ends 92 of the branches 86, 88, the front plane L5 is arranged in front of the crest plane L4.

Figure 11:
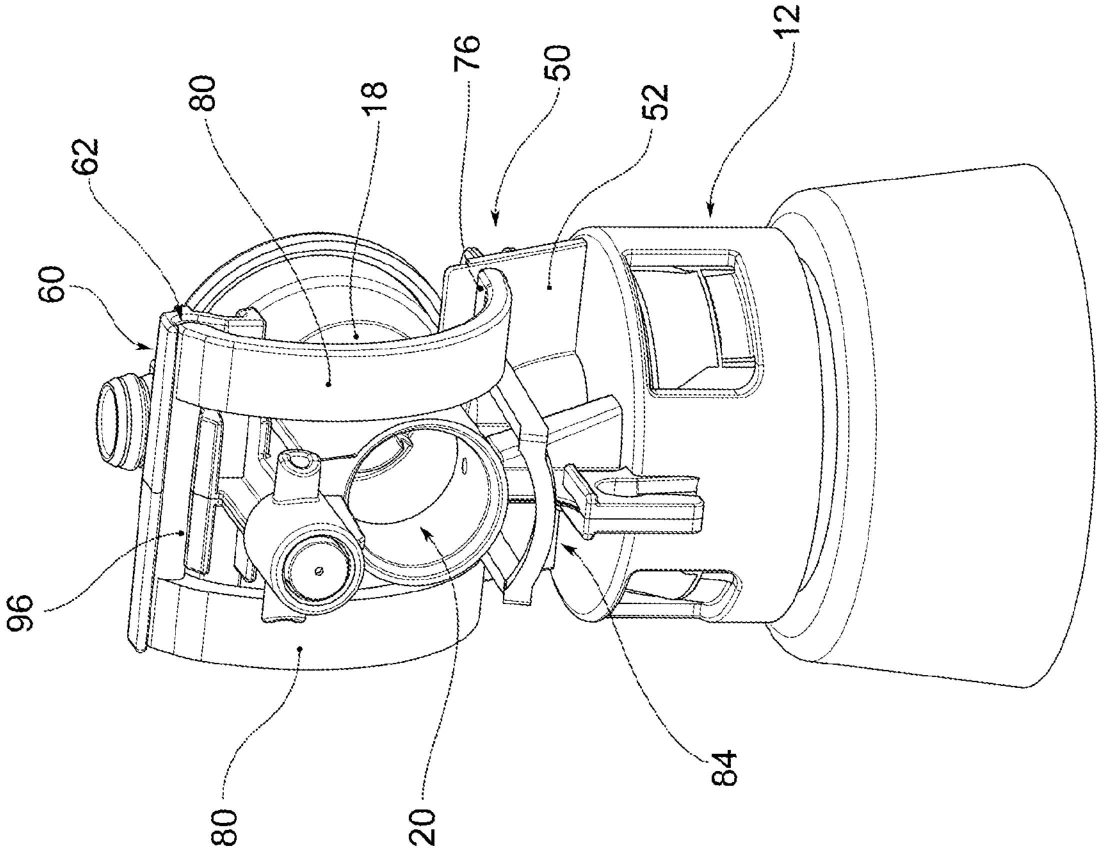
FIG. 11 shows the frame and the return element in a resting configuration.
Figure 13:
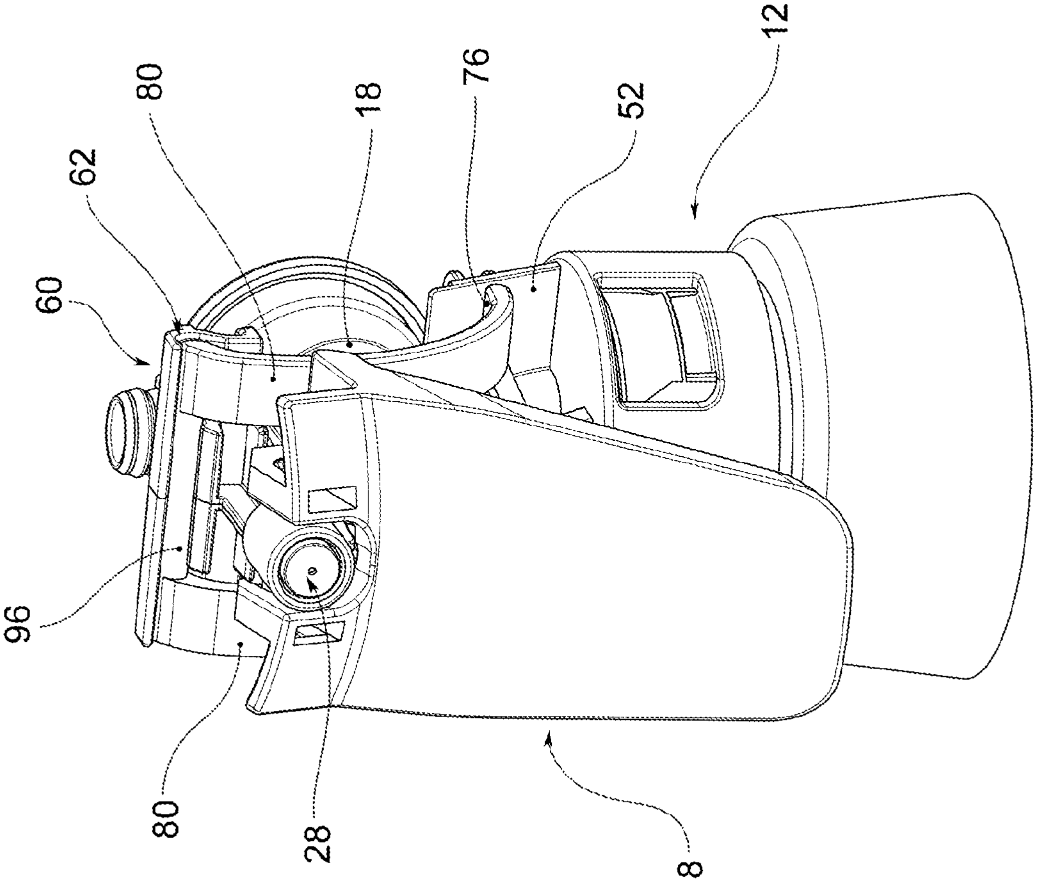
FIG. 13 shows the frame and the return element in an intermediate actuating configuration.
Figure 15:
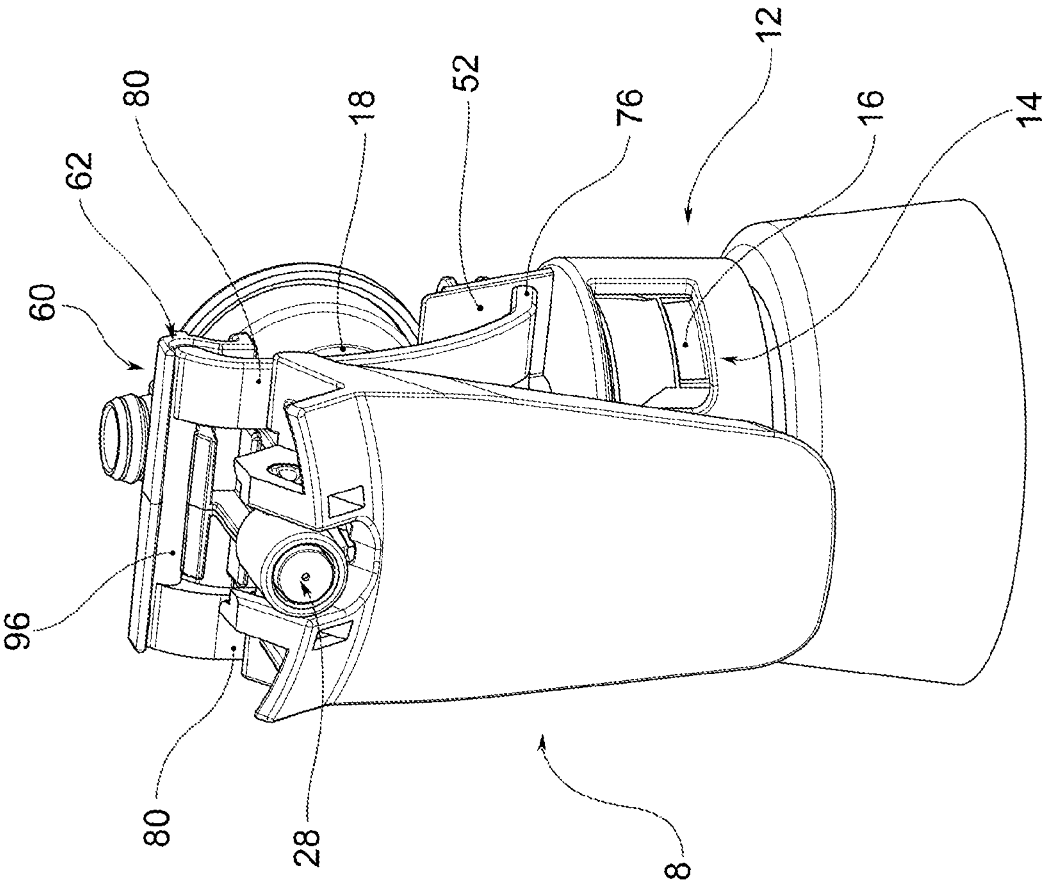
FIG. 15 shows the frame and the return element in an end actuating configuration.

When the return element 70 is applied to the frame (FIGS. 11, 13, and 15), said return element 70 is arranged straddling the symmetry plane S, i.e., each arm 72, 74 is arranged in a respective semi-part R, L of the head 6; in other words, the piston chamber 20 is arranged between said arms 72, 74. The front faces 80 are forward-facing and the rear faces 82 backward-facing.

Furthermore, the upper joining portion 96 backs the upper backing part 60, and in particular is accommodated in the seat 62, preferably engaged by snapping with said upper backing part 60.

Instead, the lower ends 76 of the two arms 72, 74 back the lower backing part 50, and in particular are in contact with the main surface 52.

The lower ends 76 of the two arms 72, 74 are freely movable on the main surface 52 in receding and approaching relative to the upper ends 78 between a plurality of zones of said main surface 52 spaced along the skirt axis J of the skirt 12*b*.

The lower joining portion 84 is instead arranged under the piston chamber 20, and in particular between the piston chamber 20 and the connecting portion 12 of the frame 10.

Figure 12:
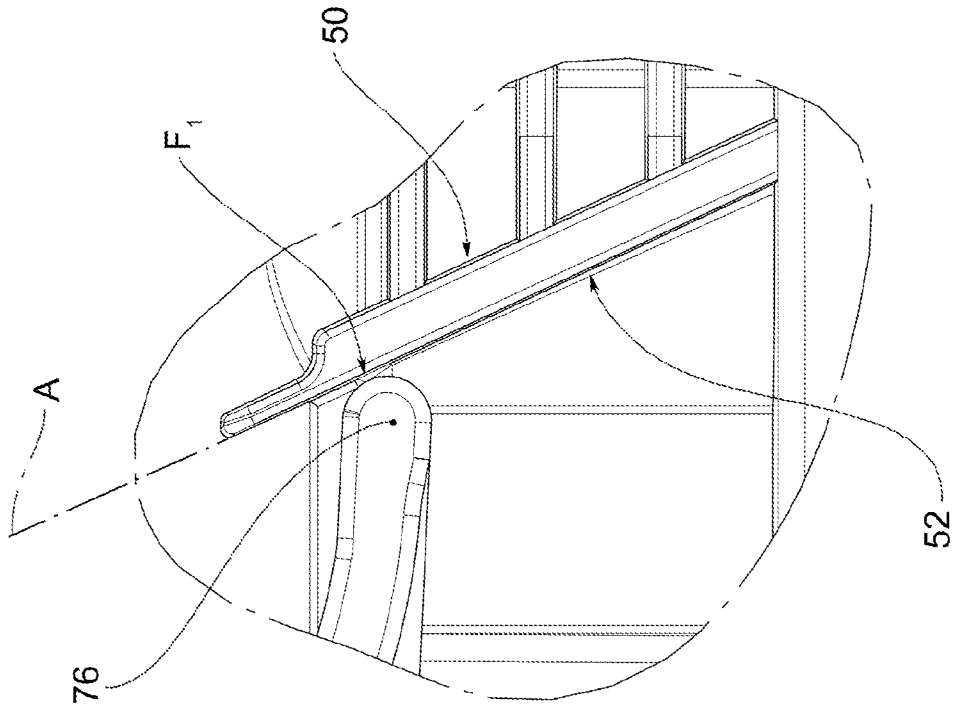
FIG. 12 shows a detail of the contact zone between the frame and the return element in the resting configuration.

In a resting configuration of the head 6 (FIG. 11), in which the trigger 8 is not biased by the user, the lower ends 76 of the arms 72, 74 of the return element 70 are in contact with the main surface 52 of the lower backing part 50 in a resting zone F1 of said main surface 52 (FIG. 12).

Figure 14:
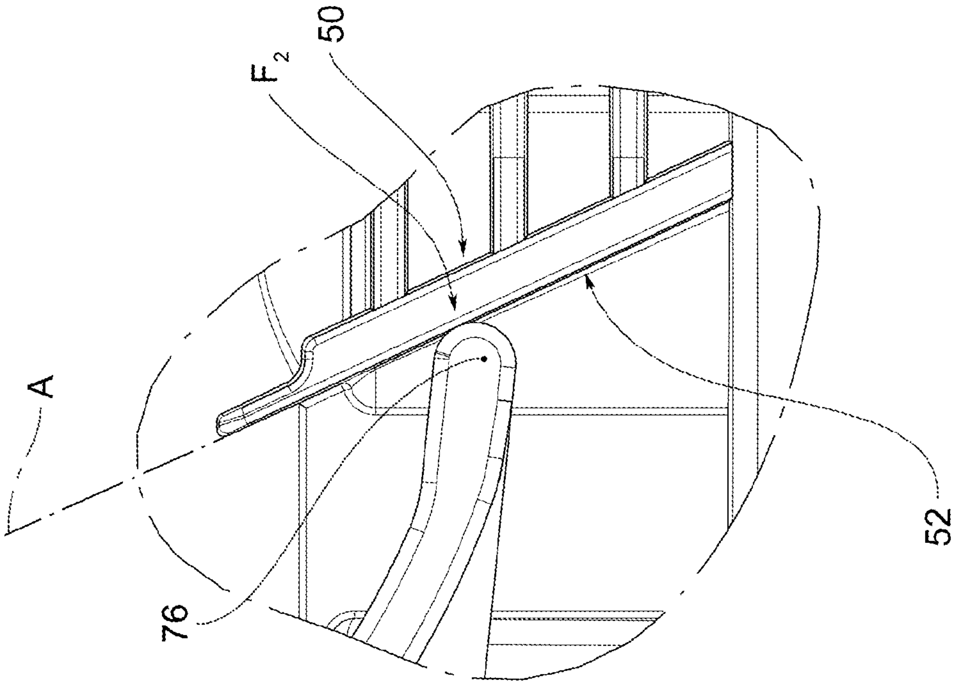
FIG. 14 shows a detail of the contact zone between the frame and the return element in the intermediate actuating configuration.

In an intermediate actuating configuration, of the head 6 (FIG. 13), in which the trigger 8 is biased by the user, the lower ends 76 of the arms 72, 74 of the return element 70 are in contact with the main surface 52 of the lower backing part 50 in an intermediate actuating zone F2 of said main surface 52 (FIG. 14), different from the resting zone F1.

Figure 16:
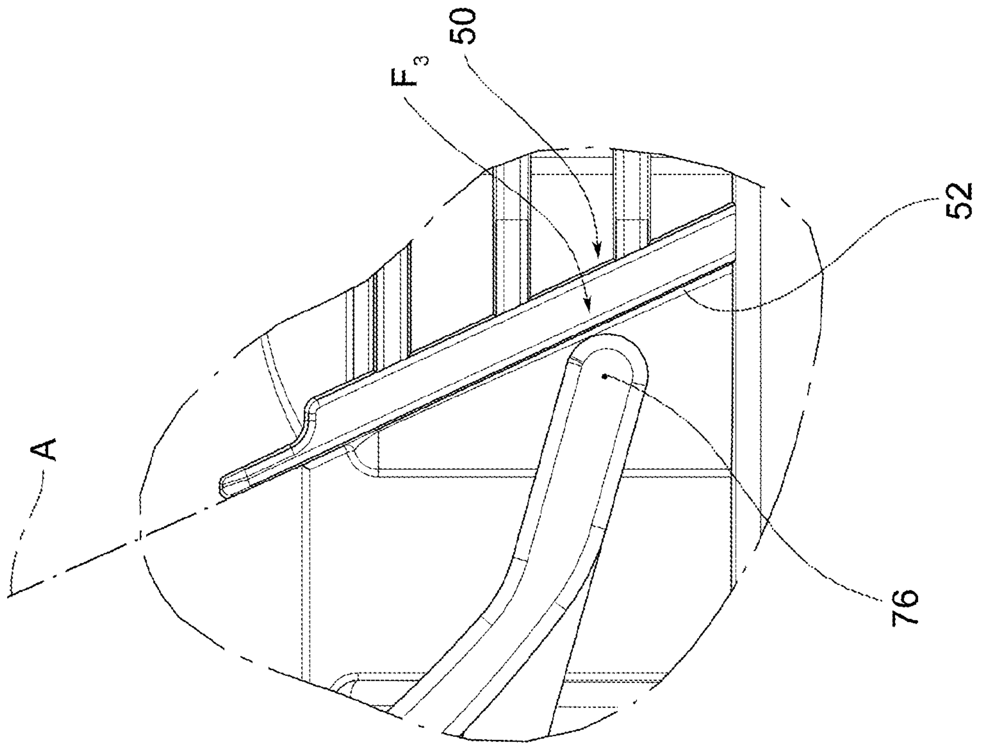
FIG. 16 shows a detail of the contact zone between the frame and the return element in the end actuating configuration.

Finally, in an end actuating configuration of the head 6 (FIG. 15), in which the trigger 8 is biased by the user and at end of travel, the lower ends 76 of the arms 72, 74 of the return element 70 are in contact with the main surface 52 of the lower backing part 50 in an end actuating zone F3 of said main surface 52 (FIG. 16), different from the resting zone F1 and intermediate actuating zone F2.

In particular, the end actuating zone F3 is under the intermediate actuating zone F2 and the intermediate actuating zone F2 is under the resting zone F1 (consequently, the end actuating zone F3 is under the resting zone F1).

In other words, along the skirt axis J, the resting zone F1 is positioned above and distanced from the intermediate actuating zone F2. Furthermore, the intermediate actuating zone F2 is positioned above and distanced from the end actuating zone F3.

Figure 18:
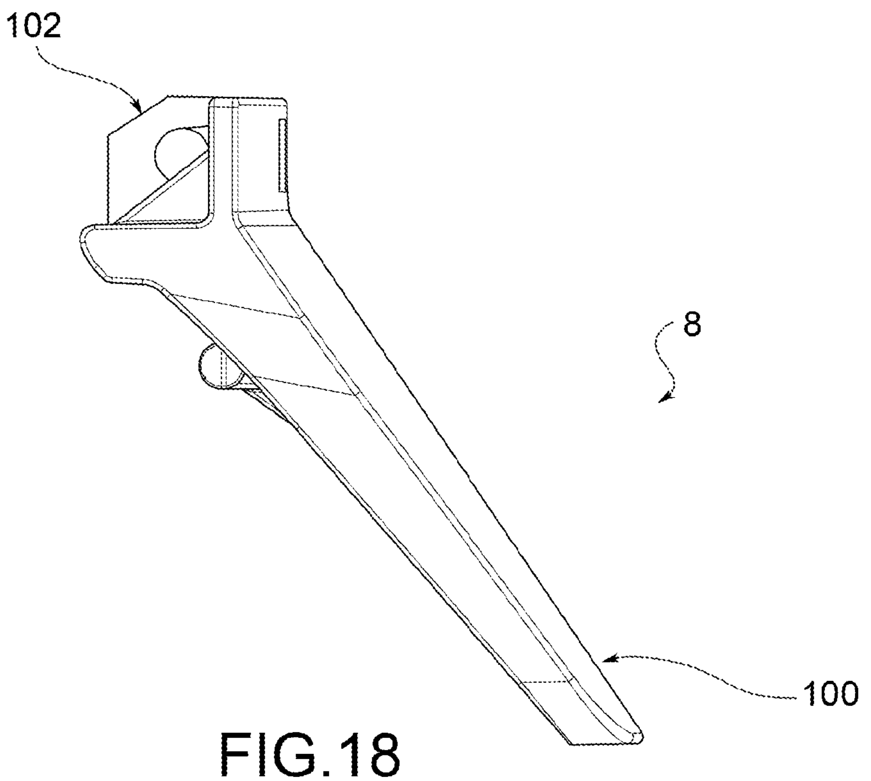
FIGS. 17 and 18 show an embodiment of a trigger of the dispensing device in FIG. 1.
Figure 17:
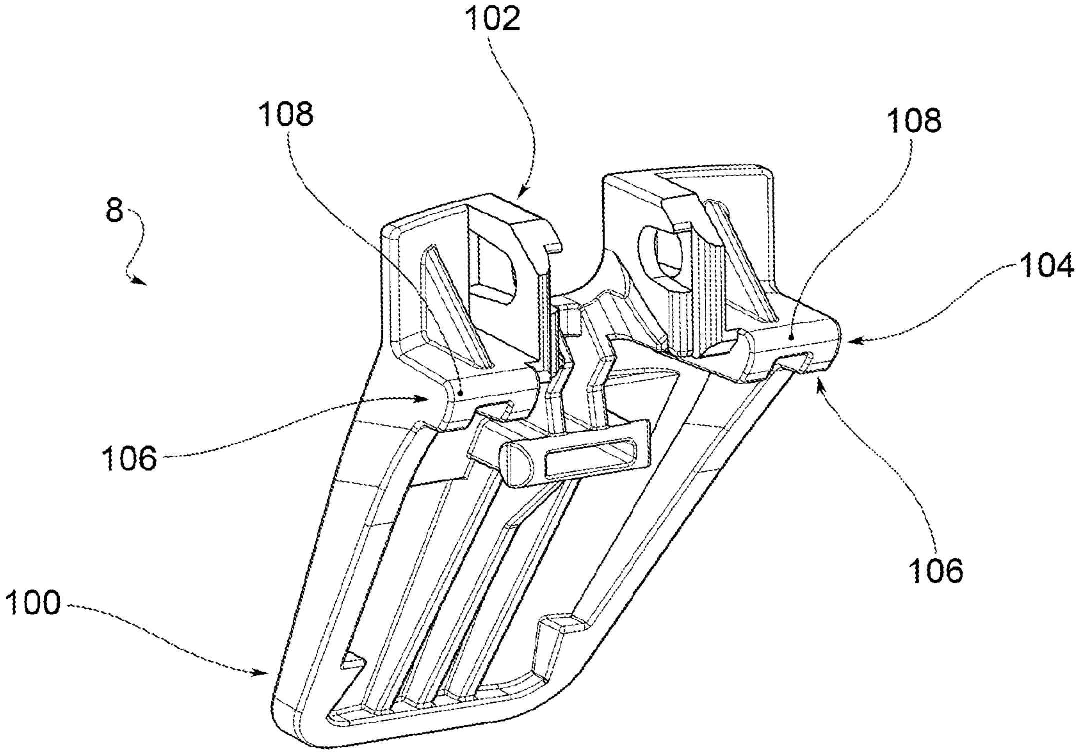

The trigger 8 (FIGS. 17 and 18) comprises a gripping portion 100 for the user's fingers, an engagement portion 102, e.g., located at the end of the gripping portion 100, for engaging with the frame 10, and an actuating portion 104 for operating on the return element 70. For example, the actuating portion 104 comprises two noses 106, each one intended to operate on one of the arms 72, 74 of the return element 70.

Preferably, each nose 106 protrudes behind from the gripping portion 100 and ends with a contact surface 108 shaped to make a cam in contact with the arms 72, 74 of the return element 70, to optimize the course of the resistance action applied by the return element, perceived by the user's fingers.

Figure 19:
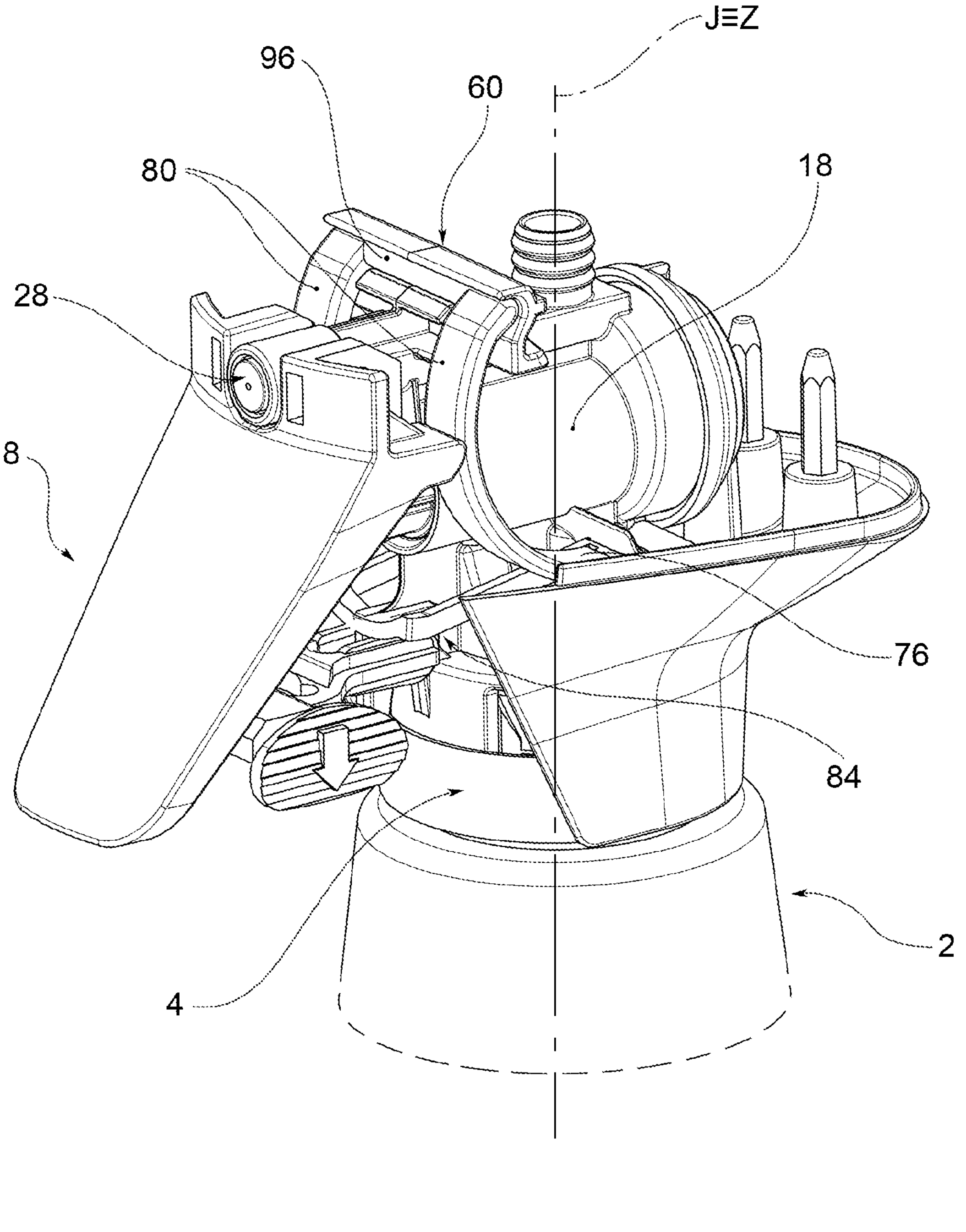
FIG. 19 shows the trigger, the return element and the frame, in a resting configuration.

Having attached the trigger 8 to the frame 10 (FIG. 19), the trigger 8 is hinged to the frame 10, preferably through the engagement portion 102 hinged to a pin protruding from the second wall 24 of the dispensing pipe 26. The trigger 8 is preloaded by the return element 70 so that the noses 106 are permanently in contact with the front faces 80 of the arms 72, 74 of the return element 70.

Further Variant Embodiments

According to a variant embodiment, the pumping means comprise a piston chamber delimited by a deformable elastic membrane.

According to a further variant embodiment, the dispensing pipe is delimited by a flexible tube connecting the piston chamber to the nozzle.

According to a yet further variant embodiment, the non-return valve means comprise a flexible membrane valve.

According to a variant embodiment, the dispensing valve means comprise a spring-piston assembly.

According to a further variant embodiment, the backing part angle is a right angle.

According to a yet further embodiment variant, the trigger is translatable relative to the frame between a resting configuration and an actuating configuration or is roto-translatable.

According to a variant embodiment, the non-return element operates directly on the piston, returning it from the actuating position to the resting position; the piston, in turn, operates on the trigger.

Innovatively, the trigger dispensing device according to the present invention makes it possible to limit incipient stresses in the return element, so that the return element does not experience yielding, even after repeated cycles of use, while still providing the necessary return action to the trigger.

This meets, in particular, the needs of the sector for what has been said about mini-triggers and the need to make them with plastic materials belonging to the same family.

In particular, advantageously, the conformation of the lower backing part and the movable lower ends on the main surface, make it possible to limit the entity of the stresses arising in the return element at every step of use of the device, thus avoiding yielding.

Advantageously, the conformation of the upper backing part and the upper ends rotatable therein, make it possible to limit the entity of the biases arising in the return element in every step of use of the device, thus avoiding yielding.

According to a further advantageous aspect, the conformation of the trigger noses allows the action on the trigger and the return element to be optimized.

It is apparent that a person skilled in the art may make changes to the trigger dispensing device described above, all of which are contained within the scope of protection as defined in the following claims to satisfy contingent needs.

What is claimed is:

1. A trigger dispensing head for dispensing a liquid product, configured to be applied to a bottle of a dispensing device, the trigger dispensing head comprising:

a frame for supporting components of the trigger dispensing head, comprising a connecting portion for connection to the bottle, the connecting portion comprising an annular skirt having a skirt axis;

a piston chamber supported by the frame, having extension along a piston axis, and a piston sealingly sliding in the piston chamber, between a resting position and a dispensing position in which the liquid product is dispensed outside;

a dispensing pipe supported by the frame, fluidly in communication with the piston chamber, for dispensing, at the front, the liquid product, the dispensing pipe having extension along a dispensing axis, wherein the piston axis and the dispensing axis lie on an imaginary sagittal plane;

a trigger supported by the frame and adapted to bias the piston from the resting position to the dispensing position;

an at least partially elastic return element, supported by the frame and adapted to bias the piston, permanently and either directly or indirectly, from the dispensing position to the resting position, wherein the return element comprises two arms, and wherein each arm of the two arms has extension between a lower end and an upper end and is arranged in a respective part of the sagittal plane; and a lower backing part supported by the frame, having a main surface, said lower ends of the return element being in contact with the main surface and freely movable thereon in receding and approaching relative to the upper ends between a plurality of zones of said main surface distanced along the skirt axis.

2. The trigger dispensing head of claim 1, wherein the lower backing part is arranged between the piston chamber and the connection portion of the frame.

3. The trigger dispensing head of claim 1, wherein the main surface is planar and lies on a backing plane incident to a base plane orthogonal to a neck axis.

4. The trigger dispensing head of claim 3, wherein:

in a resting configuration, the lower ends of the two arms of the return element are in contact with the main surface of the lower backing part in a resting zone of said main surface, and in an end actuating configuration, the lower ends of the two arms of the return element are in contact with the main surface of the lower backing part in an end actuating zone so that the end actuating zone is underneath the resting zone.

5. The trigger dispensing head of claim 3, wherein the backing plane forms, at the front with the base plane, an acute backing angle.

6. The trigger dispensing head of claim 5, wherein the acute backing angle is greater than 60°.

7. The trigger dispensing head of claim 5, wherein the acute backing angle ranges between 65° and 85°.

8. The trigger dispensing head of claim 5, wherein the acute backing angle is equal to 75°.

9. The trigger dispensing head of claim 1, further comprising an upper backing part, supported by the frame, placed above the dispensing axis with respect to the piston axis, said return element being engaged with the upper backing part at the upper ends.

10. The trigger dispensing head of claim 9, wherein the upper backing part has a seat having an arched bottom seat surface, and wherein an upper crosspiece of the return element, which joins the upper ends, pivots in the seat.

11. The trigger dispensing head of claim 1, wherein each arm has of the two arms comprises a convex, forward-facing front face and a concave, backward-facing rear face.

12. The trigger dispensing head of claim 1, wherein the return element is made in one piece of a plastic material.

13. The trigger dispensing head of claim 12, wherein the plastic material is selected from the group consisting of polyolefins, post-consumer recycled (PCR) materials, and post-industrial recycled (PIR) materials.

14. The trigger dispensing head of claim 1, further comprising:

an inlet pipe adapted to establish communication between a compartment inside the bottle and the piston chamber; and non-return valve means, operating along the inlet pipe, adapted to allow the liquid product to transit from the bottle to the piston chamber during a suction step, and to prevent the liquid product from returning from the piston chamber to the bottle in a dispensing step.

15. The trigger dispensing head of claim 1, further comprising:

an outlet pipe adapted to establish communication between the piston chamber and the dispensing pipe; and dispensing valve means, operating along the outlet pipe, adapted to allow the liquid product to transit from the piston chamber towards the outlet pipe during a dispensing step, and to prevent air from outside the piston chamber from entering during a suction step.

16. The trigger dispensing head of claim 15, wherein the dispensing valve means are precompression valve means, adapted to allow the liquid product to transit from the piston chamber to the dispensing pipe only when pressure of the liquid product in the piston chamber exceeds a predetermined threshold value.

17. The trigger dispensing head claim 15, wherein said dispensing valve means are mechanically triggered.

18. A trigger dispensing device comprising:

a trigger dispensing head according to claim 1, and a bottle for containing a liquid product to be dispensed, said trigger dispensing head being applied to a neck of the bottle.

* * * * *